US010574947B2

(12) United States Patent
Lindner et al.

(10) Patent No.: US 10,574,947 B2
(45) Date of Patent: Feb. 25, 2020

(54) OBJECT RECONSTRUCTION IN DISPARITY MAPS USING DISPLACED SHADOW OUTLINES

(71) Applicant: QUALCOMM Incorporated, San Diego, CA (US)

(72) Inventors: Albrecht Johannes Lindner, La Jolla, CA (US); Hasib Ahmed Siddiqui, San Diego, CA (US); Kalin Mitkov Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/211,877

(22) Filed: Jul. 15, 2016

(65) Prior Publication Data
US 2018/0020195 A1    Jan. 18, 2018

(51) Int. Cl.
*H04N 9/00* (2006.01)
*G06K 9/62* (2006.01)
(Continued)

(52) U.S. Cl.
CPC ............ *H04N 9/00* (2013.01); *G06K 9/6267* (2013.01); *G06K 19/06112* (2013.01);
(Continued)

(58) Field of Classification Search
CPC ...................................................... H04N 9/00
(Continued)

(56) References Cited

U.S. PATENT DOCUMENTS 9,036,933 B2 * 5/2015 Shimizu ............ H04N 13/0048
382/232
2010/0182406 A1   7/2010 Benitez
(Continued)

FOREIGN PATENT DOCUMENTS

JP       2014022867 A     2/2014

OTHER PUBLICATIONS

Yu Yu et al: "A Shadow Repair Approach for Kinect Depth Maps", Nov. 5, 2012 (2012-11-85}, Computer Vision ACCV 2012, Springer Berlin Heidelberg, Berlin, Heidelberg, pp. 615-626, XP047027216, ISBN: 978-3-642-37446-3.*
(Continued)

*Primary Examiner* — Jefferey F Harold
*Assistant Examiner* — Justin B Sanders
(74) *Attorney, Agent, or Firm* — Paradice and Li LLP

(57) ABSTRACT

Systems and methods for reconstructing an object boundary in a disparity map generated by a structured light system are disclosed. One aspect is a structured light system. The system includes an image projecting device configured to project codewords. The system further includes a receiver device including a sensor, the receiver device configured to sense the projected codewords reflected from an object. The system further includes a processing circuit configured to generate a disparity map of the object, detect a first boundary of the object in the disparity map, identify a shadow region in the disparity map adjoining the first boundary, the shadow region including pixels with codeword outages, and change a shape of the object in the disparity map based on the detected shadow region. The system further includes a memory device configured to store the disparity map.

27 Claims, 11 Drawing Sheets

(51) Int. Cl.
*G06T 7/521* (2017.01)
*G06T 7/10* (2017.01)
*G06T 7/50* (2017.01)
*G06K 19/06* (2006.01)
*G06T 11/20* (2006.01)

(52) U.S. Cl.
CPC ............... *G06T 7/10* (2017.01); *G06T 7/50* (2017.01); *G06T 7/521* (2017.01); *G06T 11/20* (2013.01); *G06T 2207/20112* (2013.01)

(58) Field of Classification Search
USPC ........................................................ 348/777
See application file for complete search history.

(56) References Cited

U.S. PATENT DOCUMENTS

| 2010/0302395 | A1 | 12/2010 | Mathe et al. | |
|---|---|---|---|---|
| 2011/0293137 | A1* | 12/2011 | Gurman | G06K 9/00201 382/103 |
| 2012/0327430 | A1 | 12/2012 | Lee et al. | |
| 2013/0315501 | A1* | 11/2013 | Atanassov | G06T 5/001 382/275 |
| 2015/0116353 | A1* | 4/2015 | Miura | G06T 11/60 345/632 |
| 2015/0371393 | A1 | 12/2015 | Ramachandra et al. | |

OTHER PUBLICATIONS

Yu Yu et al: "A Shadow Repair Approach for Kinect Depth Maps", Nov. 5, 2012 (2012-11-85}, Computer Vision ACCV 2012, Springer Berlin Heidelberg, Berlin, Heidelberg, pp. 615-626, XP047027216, ISBN: 978-3-642-37446-3 (Year: 2012).*

Hudson B., "Computer Vision CS 611 Fall 2012—Emphasis on Filtering & Depth Map Occlusion Filling", Oct. 28, 2014, XP055388547, Retrieved from the Internet: URL:https://web.archive.org/web/20141028203347/http://people.clarkson.edu:80/~hudsonb/courses/cs611/, 6 pages.

International Search Report and Written Opinion—PCT/US2017/033827—ISA/EPO—dated Jul. 18, 2017.

Lim H., et al., "Bi-Layer Inpainting for Novel View Synthesis", 18th IEEE International Conference on Image Processing, Sep. 11, 2011, XP032079767, DOI: 10.1109/ICIP.2011.6115615, ISBN : 978-1-4577-1304-0, pp. 1089-1092.

Yu Y., et al., "A Shadow Repair Approach for Kinect Depth Maps", Nov. 5, 2012, Computer Vision ACCV 2012, Springer Berlin, Heidelberg, XP047027216, ISBN: 978-3-642-37446-3, pp. 615-626.

* cited by examiner

OBJECT RECONSTRUCTION IN DISPARITY MAPS USING DISPLACED SHADOW OUTLINES

BACKGROUND

Field

Various features relate to active depth sensing, and more specifically to object reconstruction in disparity maps using displaced shadow outlines.

Description of the Related Art

Imaging devices that are structured light active sensing systems include a transmitter and a receiver configured to transmit (project) and receive patterns corresponding to spatial codes (or "codewords") to generate a disparity map that indicates the distance of one or more objects in a scene from the imaging device. The farther away an object in a scene is from the transmitter and the receiver, the closer a received codeword reflected from the object is from its original position (compared to the transmitted codeword) because a propagation path of the outgoing codeword and the reflected incoming codeword are more parallel. Conversely, the closer the object is to the transmitter and receiver, the farther the received codeword is from its original position in the transmitted codeword. Accordingly, the difference between the position of a received codeword and the corresponding transmitted codeword may be used to determine the depth of an object in a scene. Structured light active sensing systems may use these determined depths to generate a disparity map of a scene, which may be a three dimensional representation of the scene. Many applications may benefit from determining a disparity map of a scene, including image quality enhancement and computer vision techniques.

Each codeword may be represented by rows and columns of intensity values corresponding to symbols. For example, binary spatial codes may use zeros (0's) and ones (1's), corresponding to dark and bright intensity values, to represent a binary pattern. Other spatial codes may use more than two different intensity values corresponding to more than two symbols. Other spatial representations also may be used.

Generating a disparity map depends on detecting codewords. To detect codewords made up of an array of symbols, decoding filters may identify spatial boundaries for codewords and symbols, and classify symbols as, for example, "0" or "1" based on their intensity values. Decoding filters may use matched filters, corresponding to the set of harmonic basis functions used to define the set of possible codewords, to classify incoming basis functions. Therefore, disparity map accuracy depends on accurately receiving symbols, codewords, and/or basis functions.

Shadows near an object (for example, along one side of the object) can be present in the image due to the relative position of the projector, the object, and a background behind the object, resulting in spatial code gaps (outages) at these pixels (outage pixels). Outages may also come from surfaces with irregular textures (such as hair), object tilt with respect to the camera, or partial occlusions which cause shadow regions. Therefore, there is a need for methods and systems to reconstruct object boundaries in shadow regions. The reconstructed object boundaries could then be used to produce more accurate and complete disparity maps from structured light systems.

SUMMARY

A summary of sample aspects of the disclosure follows. For convenience, one or more aspects of the disclosure may be referred to herein simply as "some aspects." Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include efficient ways of object reconstruction in disparity maps using displaced shadow outlines resulting in fewer decoding errors.

One innovation is a structured light system. The structured light system may include an image projecting device configured to project codewords. The structured light system may further include a receiver device including a sensor, the receiver device configured to sense the projected codewords reflected from an object. The structured light system may further include a processing circuit configured to generate a disparity map of the object. The processing circuit may be further configured to detect a first boundary of the object in the disparity map. The processing circuit may be further configured to identify a shadow region in the disparity map adjoining the first boundary, the shadow region including pixels with codeword outages. The processing circuit may be further configured to determine a boundary of the shadow region. The processing circuit may be further configured to determine a width of the shadow region. The processing circuit may be further configured to change a shape of the object in the disparity map. The structured light system may further include a memory device configured to store the disparity map.

For some implementations, the processing circuit is further configured to displace a representation of the shadow boundary towards the object by the width of the shadow region. For some implementations, the processing circuit is further configured to form a second boundary of the object using the determined boundary and width. In various implementations, changing the shape of the object in the disparity map is based on a representation of the determined boundary displaced towards the object by the width of the shadow region.

For some implementations, the processing circuit is further configured to determine the width of the shadow region based on a number of adjacent pixels in the shadow region from a plurality of rows of the disparity map. For some implementations, the processing circuit is further configured to determine the width by calculating a median number of adjacent pixels in the shadow region adjoining the first boundary. For some implementations, the processing circuit is further configured to determine the width by calculating an average number of adjacent pixels in the shadow region adjoining the first boundary. For some implementations, the processing circuit is further configured to adjust the width of the shadow region to shift the displacement of the representation of the shadow boundary to increase overlap between the first boundary and the second boundary.

For some implementations, the processing circuit smooths portions of the first boundary that do not adjoin the shadow region using disparity map values of adjoining object pixels. For some implementations, the processing circuit is further configured to update the disparity map based on the changed shape of the object in the disparity map. For some implementations, the memory device is further configured to store the updated disparity map.

Another innovation is a method of reconstructing an object boundary in a disparity map. The method may include projecting codewords with an image projecting device. The method may further include sensing the projected codewords reflected from an object with a receiver device including a sensor. The method may further include generating a disparity map of the object. The method may further include storing the disparity map with a memory device. The method may further include detecting a first boundary of the object in the disparity map. The method may further include identifying a shadow region in the disparity map adjoining the first boundary, the shadow region including pixels with codeword outages. The method may further include determining a boundary of the shadow region. The method may further include determining a width of the shadow region. The method may further include changing a shape of the object in the disparity map.

In various embodiments, the method may further include displacing a representation of the shadow boundary towards the object by the width of the shadow region. In various embodiments, the method may further include forming a second boundary of the object using the determined boundary and width. In various implementations, a representation of the determined boundary displaced towards the object by the width of the shadow region is used to change the shape of the object in the disparity map.

In various embodiments, the method may further include determining the width of the shadow region based on a number of adjacent pixels in the shadow region from a plurality of rows of the disparity map. In various embodiments, the method may further include determining the width by calculating a median number of adjacent pixels in the shadow region adjoining the first boundary. In various embodiments, the method may further include determining the width by calculating an average number of adjacent pixels in the shadow region adjoining the first boundary. In various embodiments, the method may further include adjusting the width of the shadow region to shift the displacement of the representation of the shadow boundary to increase overlap between the first boundary and the second boundary.

In various embodiments, the method may further include smoothing portions of the first boundary that do not adjoin the shadow region using disparity map values of adjoining object pixels. In various embodiments, the method may further include updating the disparity map based on the changed shape of the object in the disparity map. In various embodiments, the method may further include storing the updated disparity map in the memory device.

Another innovation is a structured light system. The structured light system may include means for projecting codewords. The structured light system may further include means for sensing the projected codewords reflected from an object. The structured light system may further include means for generating a disparity map of the object. The structured light system may further include means for storing the disparity map. The structured light system may further include means for detecting a first boundary of the object in the disparity map. The structured light system may further include means for identifying a shadow region in the disparity map adjoining the first boundary, the shadow region including pixels with codeword outages. The structured light system may further include means for determining a boundary of the shadow region. The structured light system may further include means for determining a width of the shadow region. The structured light system may further include means for changing a shape of the object in the disparity map.

In various embodiments, the projecting means may include a laser system. In various embodiments, the sensing means may include a receiver sensor. In various embodiments, the generating means may include a processing circuit. In various embodiments, the storing means may include a memory device. In various embodiments, the first boundary detecting means may include the processing circuit. In various embodiments, the shadow region identifying means may include the processing circuit. In various embodiments, the shadow region boundary determining means may include the processing circuit. In various embodiments, the shadow region width determining means may include the processing circuit. In various embodiments, the changing means may include the processing circuit.

In various embodiments, the structured light system further includes means for displacing a representation of the shadow boundary towards the object by the width of the shadow region. In various embodiments, the structured light system further includes means for forming a second boundary of the object using the determined boundary and width.

In various embodiments, the structured light system further includes means for determining the width of the shadow region based on a number of adjacent pixels in the shadow region from a plurality of rows of the disparity map. In various embodiments, the structured light system further includes means for determining the width by calculating a median number of adjacent pixels in the shadow region adjoining the first boundary. In various embodiments, the structured light system further includes means for determining the width by calculating an average number of adjacent pixels in the shadow region adjoining the first boundary. In various embodiments, the structured light system further includes means for adjusting the width of the shadow region to shift the displacement of the representation of the shadow boundary to increase overlap between the first boundary and the second boundary.

In various embodiments, the structured light system further includes means for smoothing portions of the first boundary that do not adjoin the shadow region using disparity map values of adjoining object pixels. In various embodiments, the structured light system further includes means for updating the disparity map based on the changed shape of the object in the disparity map. In various embodiments, the structured light system further includes means for storing the updated disparity map.

Another innovation is a non-transitory computer-readable medium storing instructions that when executed cause a processor to perform a method of reconstructing an object boundary in a disparity map. The method may include projecting codewords with an image projecting device. The method may further include sensing the projected codewords reflected from an object with a receiver device including a sensor. The method may further include generating a disparity map of the object. The method may further include storing the disparity map with a memory device. The method may further include detecting a first boundary of the object in the disparity map. The method may further include identifying a shadow region in the disparity map adjoining the first boundary, the shadow region including pixels with codeword outages. The method may further include determining a boundary of the shadow region. The method may further include determining a width of the shadow region. The method may further include displacing a representation of the shadow boundary towards the object by the width of the shadow region, the displaced representation forming a second boundary of the object. The method may further include changing a shape of the object in the disparity map.

In various embodiments, the method may further include displacing a representation of the shadow boundary towards the object by the width of the shadow region. In various embodiments, the method may further include forming a second boundary of the object using the determined boundary and width. In various embodiments, the method may further include determining the width of the shadow region based on a number of adjacent pixels in the shadow region from a plurality of rows of the disparity map. In various embodiments, the method may further include adjusting the width of the shadow region to shift the displacement of the representation of the shadow boundary to increase overlap between the first boundary and the second boundary. In various embodiments, the method may further include smoothing portions of the first boundary that do not adjoin the shadow region using disparity map values of adjoining object pixels.

BRIEF DESCRIPTION OF THE DRAWINGS

Various features, aspects and advantages will become apparent from the description herein and drawings appended hereto, in which like reference symbols generally will identify corresponding aspects or components illustrated in the drawings. As a person of ordinary skill in the art will understand, aspects described or illustrated for an embodiment may be included in one or more other described or illustrated embodiments, if not impractical for the implementation or function of such an embodiment, unless otherwise stated.

DETAILED DESCRIPTION

Figure 1:
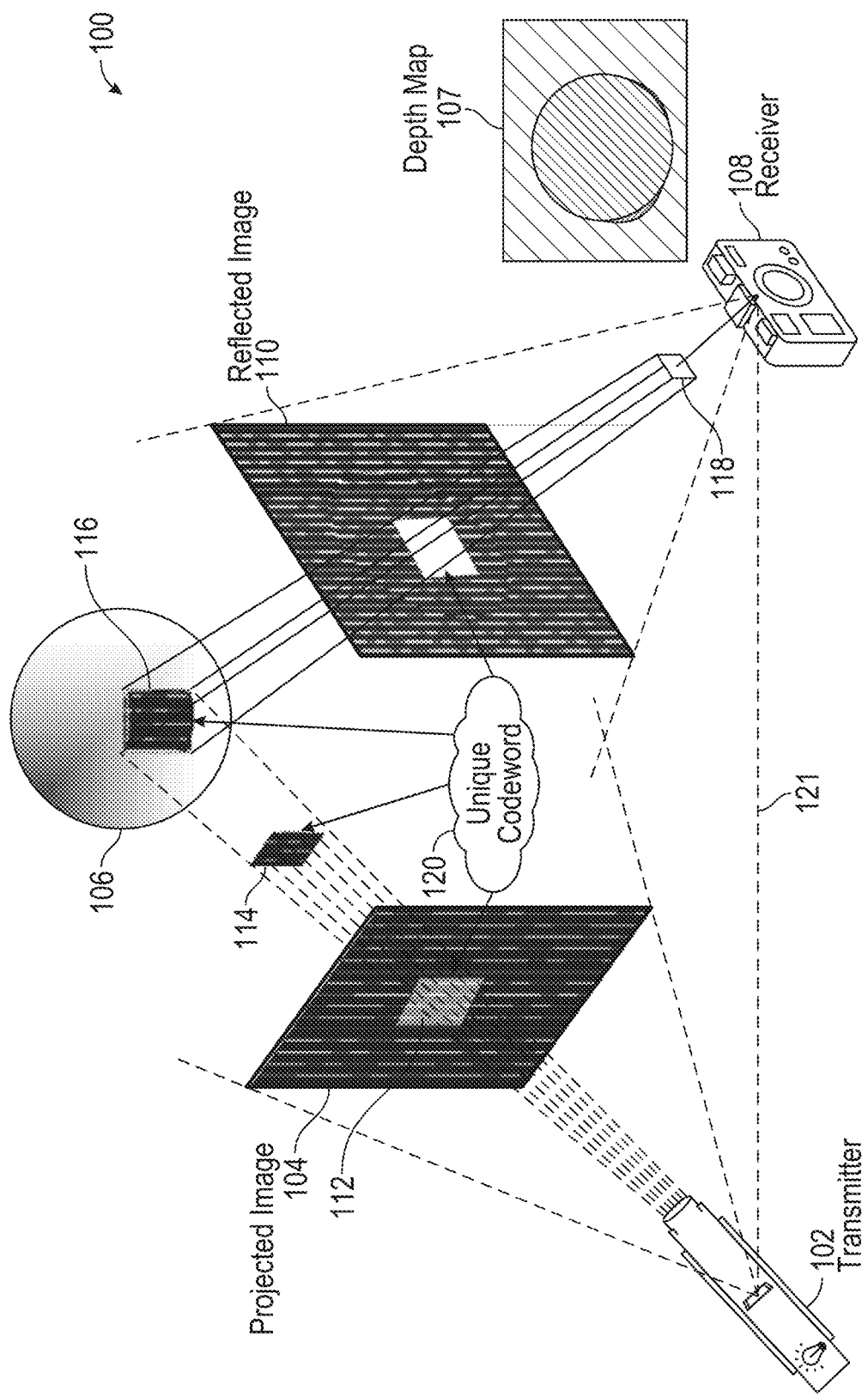
FIG. 1 is a schematic illustrating an example of an active sensing system where a known pattern is used to illuminate a scene and obtain depth information with which to generate three-dimensional (3D) information from two-dimensional (2D) images and/or information.

The following detailed description is directed to certain specific embodiments. However, the methods and systems disclosed can be embodied in a multitude of different ways. It should be apparent that aspects herein may be embodied in a wide variety of forms and that any specific structure, function, or both being disclosed herein is merely representative. Aspects disclosed herein may be implemented independently of any other aspects. Two or more of these aspects may be combined in various ways. For example, an apparatus may be implemented, or a method may be practiced, using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different imaging systems and computing devices and systems. They may use general purpose or special purpose systems.

Structured light active sensing systems project spatial codes with an infrared projector and sense an image having the spatial codes reflected from the surface of an object with a camera to generate points of a disparity map of the object. Disparity maps provide relative depth information associated with the surface of the object. Shadows near an object (for example, along one side of the object) can be present in the image due to the relative position of the projector, the object, and a background behind the object, resulting in spatial code gaps (outages) at these pixels. Depth can't be directly calculated at pixel positions with code outages; instead, depths can only be estimated at these locations. For example, if there is a single pixel outage and all neighboring pixels in the disparity map are within a tolerance of the same depth, the depth at the pixel with the outage can be accurately estimated based on the neighboring depths. However, if the neighboring pixels have different depths, because the pixel with the code outage is at or near an object boundary, then the depth at the pixel with the outage may be inaccurate because foreground and background pixels at substantially different depths will be combined or averaged, resulting in inaccurate depth estimates. More accurate estimates would be possible in shadow regions if the object boundary can be estimated, so that depth estimates are based on only those pixels on the same side of the object boundary line are considered. Outages may also come from surfaces with irregular textures (such as hair), object tilt with respect to the camera, or partial occlusions. Where there are outages, it may be difficult to accurately classify symbols, codewords, and basis functions, resulting in inaccurate disparity maps with inaccurate object boundaries.

Existing methods and system to estimate disparity in the presence of shadows may not account for object shape and boundaries. The disclosed technology includes systems and methods to fill code gaps to produce more accurate and complete disparity maps. For example, in some embodiments a method includes generating a disparity map of the object, detecting a first boundary of the object in the disparity map, identifying a shadow region in the disparity map adjoining the first boundary (the shadow region including pixels with codeword outages), determining a boundary of the shadow region, determining a width of the shadow region, displacing a representation of the shadow boundary towards the object by the width of the shadow region, the displaced representation forming a second boundary of the object, and changing the shape of the object in the disparity map based on the second boundary. This results in a more accurate representation of the object boundary for filling in outages in the disparity map, resulting in better defined object boundaries in the disparity map with more accurate depths on both sides of the boundaries.

FIG. 1 illustrates an example of an active sensing system 100 that generates three dimensional information, such as a depth map 107 (disparity map), from two dimensional images. The active sensing system 100 includes a transmitter 102 and a receiver 108. The transmitter 102 projects light through a code mask to form a projected image 104. A section 112 of projected image 104 includes a unique codeword 120 that is projected onto the scene 106. The surface of an object or objects in the scene 106 is illuminated by spatial pattern 116, which forms part of reflected image that is sensed by receiver 108. Receiver 108 senses a portion 118 (segment) of the reflected image 110, including unique codeword 120, and compares the relative position of unique codeword 120 to other unique codewords in the code mask to determine depth information, for generating a depth map 107, of the surface of object in scene 106, as described below with regard to FIG. 3. The receiver 108 forms a depth map 107 based on depth estimates over the surfaces of the objects in the scene, which reflect other identifiable codewords from other segments of reflected image 110. Each segment 118 that is captured may be uniquely identifiable at the receiver 108 and its location relative to other segments ascertained from the known pattern of the coded mask. The receiver 108 may use pattern segmentation techniques to address distortion, decoding techniques to identify codes, and triangulation to ascertain orientation and/or depth. In an embodiment, the transmitter 102 may be an infrared transmitter. In an embodiment, a single housing may include both the transmitter 102 and the receiver 108.

Figure 2:
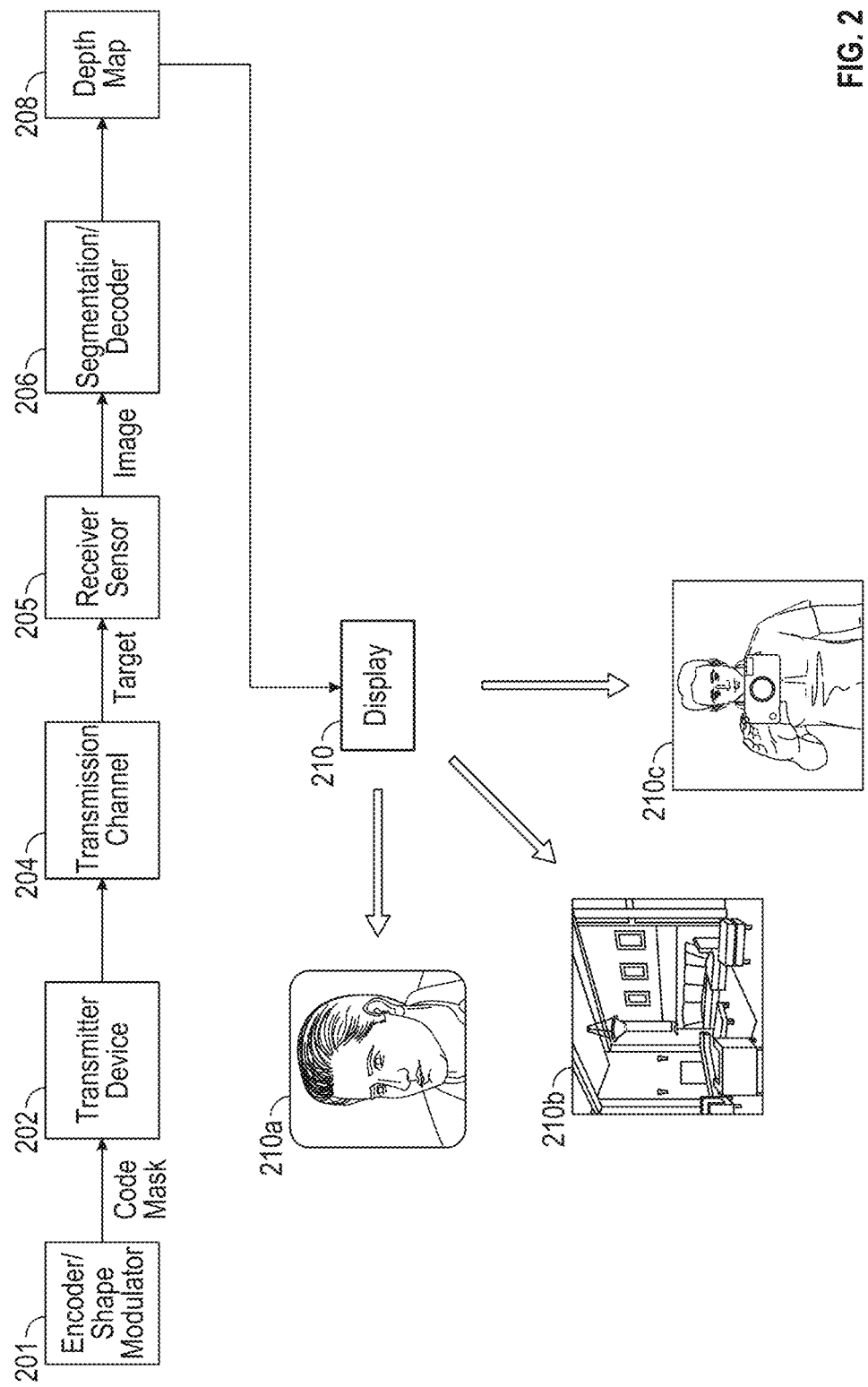
FIG. 2 is a diagram illustrating another example of a system for active sensing where a 3D scene is constructed from 2D images or information.

FIG. 2 illustrates another example of a system for active sensing to generate depth maps (disparity maps) and display three dimensional representations of scenes. An encoder/shape modulator 201 may generate a code mask which is then projected by a transmitter device 202 over a transmission channel 204. The code mask may be projected onto a target (e.g., a scene) and the reflected light is captured by a receiver sensor 205 as a projected code mask image. The receiver sensor 205 (e.g., receiver 108 in FIG. 1), captures the reflected image of the target, which segmentation/decoder 206 segments and decodes to determine depth information used to generate depth map 208. The depth map 208 may then be used to present, generate, and/or provide a 3D image version of, for example, a person 210a, a living room 210b, or a person holding a camera 210c.

Active sensing relies on being able to recognize (at the receiver sensor 205 and/or segmentation/decoder 206) spatial codes (e.g., codewords) from the code mask being projected by the transmitter device 202 on a scene. If a scene is too close to the transmitter and receiver, the surface of the scene may be angled or curved, a baseline reference plane 121 may be tilted, and the codes may be modified under an unknown affine transformation (e.g., rotation, skew, compression, elongation, etc.). One or more aspects or features described herein may be implemented within the exemplary environments of FIGS. 1 and 2

Figure 3:
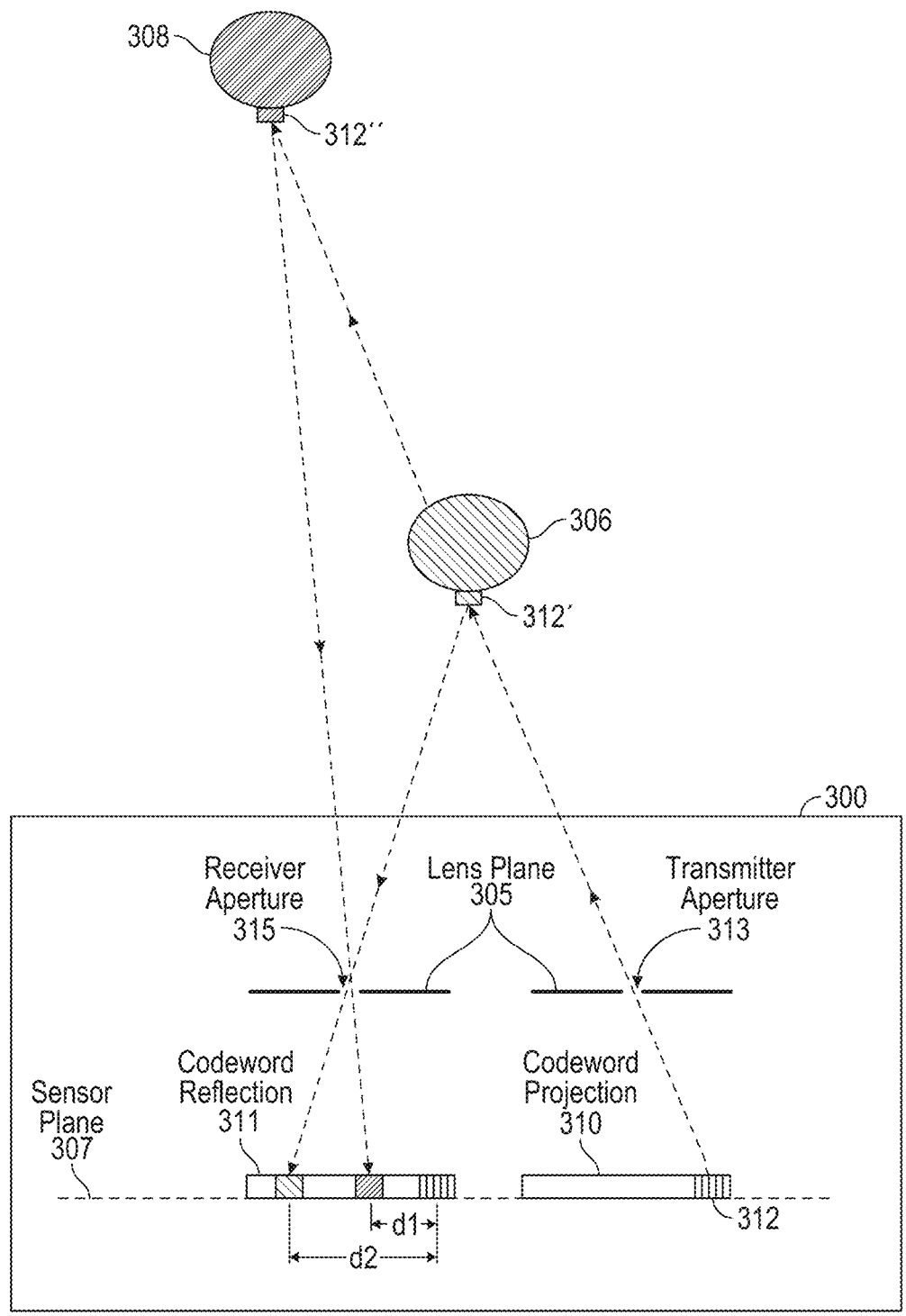
FIG. 3 is a schematic illustrating how depth may be sensed for an object or scene.

FIG. 3 illustrates an example of how depth may be sensed for one or more objects in a scene. FIG. 3 shows a device 300 that illuminates two objects 306 and 308 with structured light as codeword projection 310. The codeword projection 310 reflects from objects 306 and/or 308 and is received as a reflected codeword 311 on sensor plane 307.

As illustrated in FIG. 3, the device 300 projects codeword projection 310 through transmitter aperture 313 on lens plane 305. The device 300 receives reflected light from objects 306 and/or 308 via receiver aperture 315 on lens plane 305 and focuses the received codeword reflection 311 on sensor plane 307. Therefore, device 300 illustrates transmission and reflection of structured light in a single device. In some embodiments, the transmitter and receiver functions are performed by two separate devices.

The codeword projection 310 illuminates the object 306 as projected segment 312', and illuminates the object 308 as projected segment 312". When the projected segments 312' and 312" are received by the device 300 through receiver aperture 315, the reflected codeword 311 may show reflections generated from the object 308 at a first distance d1 and reflections generated from the object 306 at a second distance d2.

As illustrated in FIG. 3, the object 306 is located closer to the device 300 (e.g., a first distance from the device 300) and the projected segment 312' appears at a distance d2 from its initial location. In contrast, the object 308 is located further away (e.g., a second distance from the device 300), and the projected segment 312" appears at a distance d1 from its initial location (where d1<d2). That is, the further away an object is from the device 300, the closer the received projected segment/portion/window is from its original position at the device 300 (e.g., the outgoing projection and incoming projection are more parallel). Conversely, the closer an object is from the device 300, the further the received projected segment/portion/window is from its original position at the device 300. Thus, the difference between received and transmitted codeword position may be used as an indicator of the depth of an object. In one example, such depth (e.g., relative depth) may provide a depth value for objects depicted by each pixel or grouped pixels (e.g., regions of two or more pixels) in an image.

Various types of modulation and coding schemes may be used to generate a codeword projection or code mask. These modulation and coding schemes include, for example, temporal coding, spatial coding, and direct codification.

In temporal coding, patterns are successively projected onto the measuring surface over time. This technique has high accuracy and resolution but is less suitable for dynamic scenes.

In spatial coding, information is encoded in a local neighborhood based on shapes and patterns. Pseudorandom codes may be based on De-Bruijn or M-arrays define the codebook of valid codewords (e.g., m-ary intensity or color modulation). Pattern segmentation may not be easily attained, for example, where the shapes and patterns are distorted.

In direct codification, both horizontal and vertical pixel coordinates are encoded. Modulation may be by a monotonic phase or an intensity waveform. However, this scheme may utilize a codebook that is larger than the codebook utilized for other methods. In most methods, received codewords (sensed codewords) may be correlated against a defined set of possible codewords (e.g., in a codebook). Thus, use of a small set of codewords (e.g., small codebook)

may provide better performance than a larger codebook. Also, since a larger codebook results in smaller distances between codewords, additional errors may be experienced by implementations using larger codebooks.

Structured light patterns may be projected onto a scene by shining light through a codemask. Light projected through the codemask may contain one or more tessellated codemask primitives. Each codemask primitive may contain an array of spatial codes. A codebook or data structure may include the set of codes. Spatial codes, the codemask, and codemask primitives may be generated using basis functions. The periodicities of the basis functions may be chosen to meet the requirements for the aggregate pattern of Hermitian symmetry (for eliminating ghost images and simplifying manufacturing), minimum duty cycle (to ensure a minimum power per codeword), perfect window property (for optimum contour resolution and code packing for high resolution), and randomized shifting (for improved detection on object boundaries). A receiver may make use of the codebook and/or the attributes of the design intended to conform to the constraints when demodulating, decoding, and correcting errors in received patterns.

The size and corresponding resolution of the spatial codes corresponds to a physical spatial extent of a spatial code on a codemask. Size may correspond to the number of rows and columns in a matrix that represents each codeword. The smaller a codeword, the smaller an object that can be detected. For example, to detect and determine a depth difference between a button on a shirt and the shirt fabric, the codeword should be no larger than the size of the button. In some embodiments, each spatial code may occupy four rows and four columns. In some embodiments, the codes may occupy more or fewer rows and columns (rows×columns), to occupy, for example, 3×3, 4×4, 4×5, 5×5, 6×4, or 10×10 rows and columns.

The spatial representation of spatial codes corresponds to how each codeword element is patterned on the codemask and then projected onto a scene. For example, each codeword element may be represented using one or more dots, one or more line segments, one or more grids, some other shape, or some combination thereof.

A spatial code may include bright bits or portions (e.g., "1s") transmitting light through the codemask and dark bits or portions (e.g., "0s") not transmitting light through the codemask. The "duty cycle" of spatial codes corresponds to the percentage of bright bits or portions projecting light. For example, a spatial code for which 20% of the bits or portions are bright has a lower duty cycle than one for which 70% of the bits or portions are bright. Codewords with too low a duty cycle may be difficult to detect.

The "contour resolution" or "perfect window" characteristic of codes indicates that when a codeword is shifted by an amount, for example, a one-bit rotation, the resulting data represents another codeword.

Figure 4:
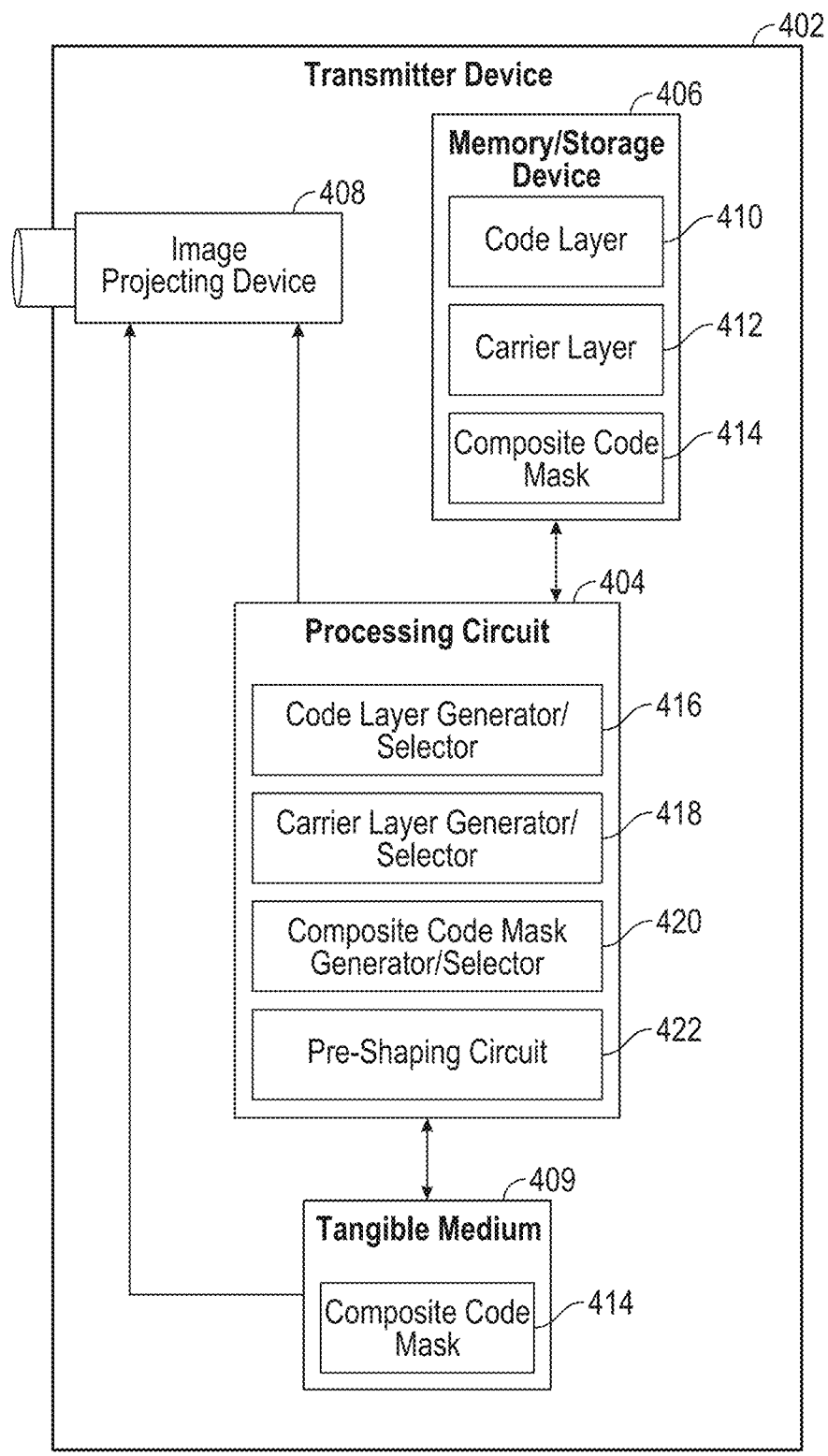
FIG. 4 is a block diagram illustrating an example of a transmitter device that may be configured to generate a composite code mask and/or project such composite code mask.

FIG. 4 is a block diagram illustrating an example of a transmitter device 402 that configured to generate a composite code mask and/or project such composite code mask. The transmitter device 402 in this example includes a processing circuit 404 coupled to a memory/storage device 406 (memory device), an image projecting device 408, and/or a tangible medium 409. The transmitter device 402 may correspond to the codeword projection 310 and transmitter aperture 312 portions of device 300 discussed above with respect to FIG. 3.

In a first example, the transmitter device 402 may include a tangible medium 409. The tangible medium may define, include, and/or store a composite code mask 414. The tangible medium 409 may be a diffractive optical element (DOE) that encodes the code mask, such that when light from a laser or other light source is projected through the DOE at, for example, a near infrared frequency, a codeword pattern image is projected from the transmitter 402. The composite code mask 414 may include a code layer combined with a carrier layer. The code layer may include uniquely identifiable spatially-coded codewords defined by a plurality of symbols. The carrier layer may be independently ascertainable and distinct from the code layer. The carrier layer may include a plurality of reference objects that are robust to distortion upon projection. At least one of the code layer and carrier layer may be pre-shaped by a synthetic point spread function prior to projection.

In a second example, the processing circuit (or processor) 404 may include a code layer generator/selector 416, a carrier layer generator/selector 418, a composite code mask generator/selector 420 and/or a pre-shaping circuit 422. The code layer generator/selector 416 may select a pre-stored code layer 410 and/or may generate such code layer. The carrier layer generator/selector 418 may select a pre-stored carrier layer 412 and/or may generate such carrier layer. The composite code mask generator/selector 416 may select a pre-stored composite code mask 414 and/or may combine the code layer 410 and carrier layer 412 to generate the composite code mask 414. Optionally, the processing circuit 404 may include a pre-shaping circuit 422 that pre-shapes the composite code mask 414, the code layer 410, and/or the carrier layer 412, to compensate for expected distortion in the channel through which the composite code mask 414 is to be projected.

In some implementations, a plurality of different code layers and/or carrier layers may be available, where each such carrier or code layers may be configured for different conditions (e.g., for objects at different distances, or different configurations between the transmitter device and receiver device). For instance, for objects within a first distance or range, a different combination of code and carrier layers may be used than for objects at a second distance or range, where the second distance is greater than the first distance. In another example, different combination of code and carrier layers may be used depending on the relative orientation of the transmitter device and receiver device.

The image projecting device 408 may serve to project the generated/selected composite code mask onto an object of interest. For instance, a laser or other light source (not shown) of the image projecting device 408 may be used to project the composite code mask onto the object of interest (e.g., through a projection channel). In one example, the composite code mask 414 may be projected in an infrared spectrum, so it may not be visible to the naked eye. Instead, a receiver sensor in the infrared spectrum range may be used to capture such projected composite code mask.

Figure 5:
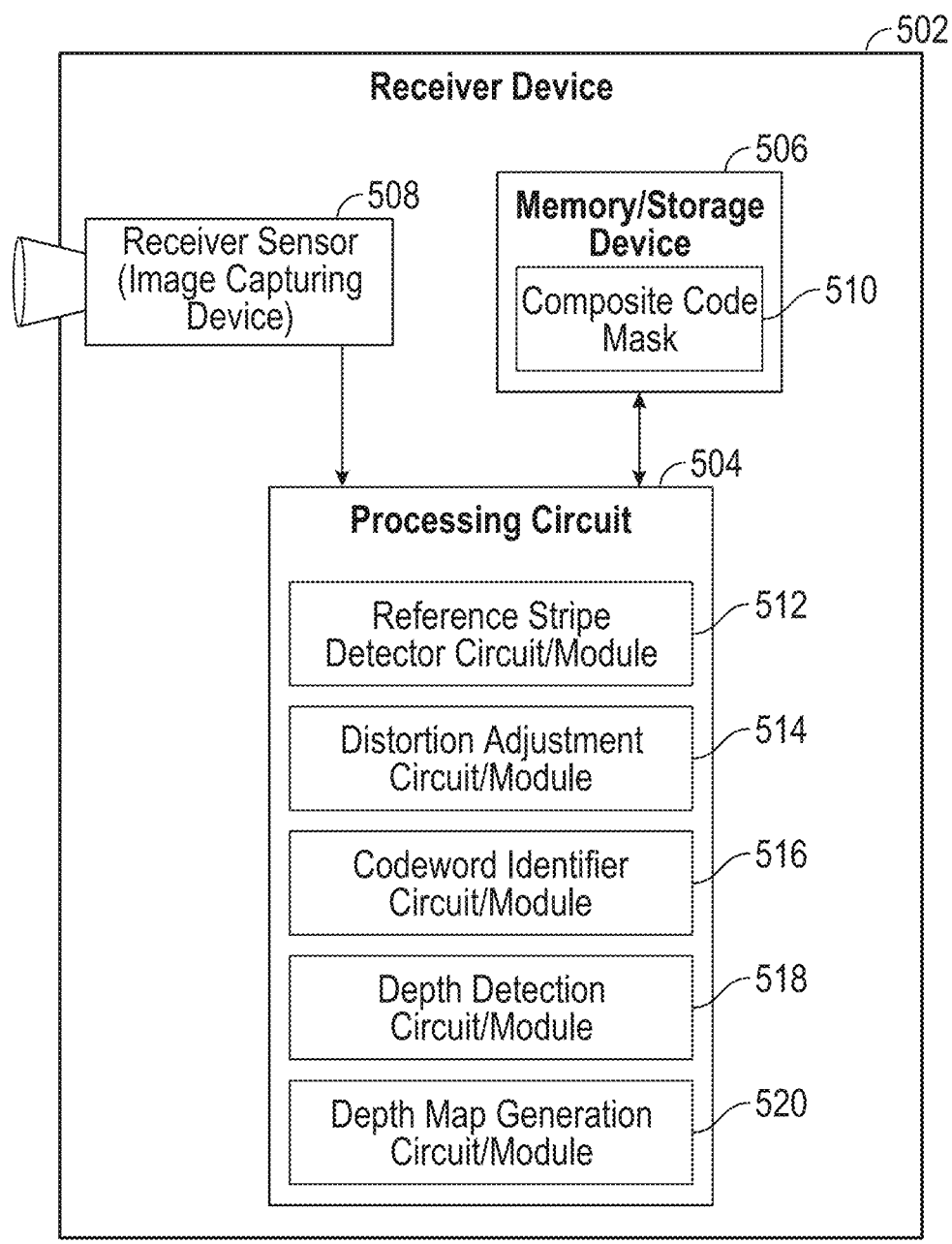
FIG. 5 is a block diagram illustrating an example of a receiver device that may be configured to obtain depth information from a composite code mask.

FIG. 5 is a block diagram illustrating an example of a receiver device 502 that is configured to receive a composite code mask reflected from an object and to determine be depth information from a composite code mask. The receiver device 502 may include a processing circuit 504 coupled to a memory/storage device and a receiver sensor 508 (e.g., an image capturing device 508). In some aspects, the receiver device 502 illustrated in FIG. 5 may correspond to the receiver aperture 315 and codeword reflection 311 of device 300 discussed above with respect to FIG. 3. In some embodiments, the receiver sensor 508 is an image capture device, for example, a camera.

The receiver sensor 508 may be configured to obtain at least a portion of a composite code mask projected on the surface of an object. For instance, the receiver sensor may capture an image of at least a portion of a composite code mask 414 projected on the surface of a target object. The composite code mask 414 may be defined by: (a) a code layer of uniquely identifiable spatially-coded codewords defined by a plurality of symbols, and (b) a carrier layer independently ascertainable and distinct from the code layer and including a plurality of reference objects that are robust to distortion upon projection. At least one of the code layer and carrier layer may have been pre-shaped by a synthetic point spread function prior to projection. In one example, the receiver sensor 508 may capture (sense) the composite code mask in the infrared spectrum.

Still referring to FIG. 5, in some embodiments, the code layer may include n1 by n2 binary symbols, where n1 and n2 are integers greater than two. In the composite code mask, each symbol may be a line segment in one of two gray-scale shades distinct from the reference objects. The symbols of the code layer may be staggered in at least one dimension. The carrier layer reference objects may include a plurality of equally spaced reference stripes with a guard interval in between. The reference stripes and the guard interval may be of different widths. The width of each reference stripe relative to a guard interval width may be determined by an expected optical spreading of a transmitter device and/or a receiver device.

The processing circuit 504 may include a reference stripe detector circuit/module 512, a distortion adjustment circuit/module 514, a codeword identifier circuit/module 516, a depth detection circuit/module 518, and/or a depth map generation circuit/module 520.

The reference stripe detector circuit/module 512 may be configured to detect reference stripes within the portion of the composite code mask. The distortion adjustment circuit/module 514 may be configured to adjust a distortion of the portion of the composite code mask based on an expected orientation of the reference stripes relative to an actual orientation of the reference stripes. The codeword identifier circuit/module 516 may be configured to obtain a codeword from a window defined within the portion of the composite code mask. The depth detection circuit/module 518 may be configured to obtain depth information for a surface portion of the target object corresponding to the window based on: (a) a single projection of the composite code mask, and (b) a displacement of the window relative to a known reference code mask.

The depth map generation circuit/module 520 may be configured to assemble a depth map for the object based on a plurality of codewords detected as different overlapping windows within the portion of the undistorted composite code mask.

Figure 6:
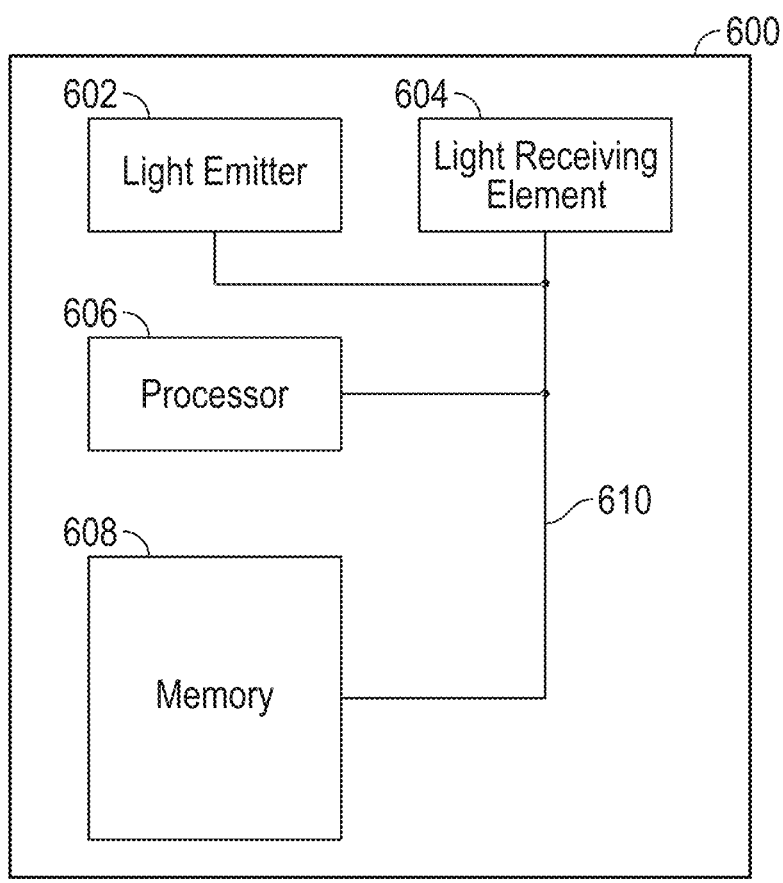
FIG. 6 is a block diagram of one embodiment of an apparatus configured to perform one or more of the error correction methods disclosed herein.

FIG. 6 is a block diagram illustrating an embodiment of an apparatus configured to perform one or more of the error correction methods disclosed herein. Apparatus 600 includes a light emitter 602, a light receiving element 604, a processor 606, and a memory 608. The light emitter 602, light receiving element 604, processor 606, and the memory 608 are operably connected via a bus 610. In some aspects, the light receiving element 604 may correspond to the receiver device 502 discussed above with respect to FIG. 5. In some aspects, the light emitter 602 may correspond to the transmitter device 402 discussed above with respect to FIG. 4.

The memory 608 may store instructions that configure the processor 606 to perform one or more functions of the methods discussed herein. For example, instructions stored in the memory may configure the processor 606 to generate a disparity map of the object, detect a first boundary of the object in the disparity map, identify a shadow region in the disparity map adjoining the first boundary (the shadow region including pixels with codeword outages), determine a boundary of the shadow region, determine a width of the shadow region, displace a representation of the shadow boundary towards the object by the width of the shadow region, the displaced representation forming a second boundary of the object, and change the shape of the object in the disparity map based on the second boundary. Instructions stored in the memory may further configure the processor change a shape of the object in the disparity map based on the detected shadow region according to the method 1500 discussed below.

Figure 7:
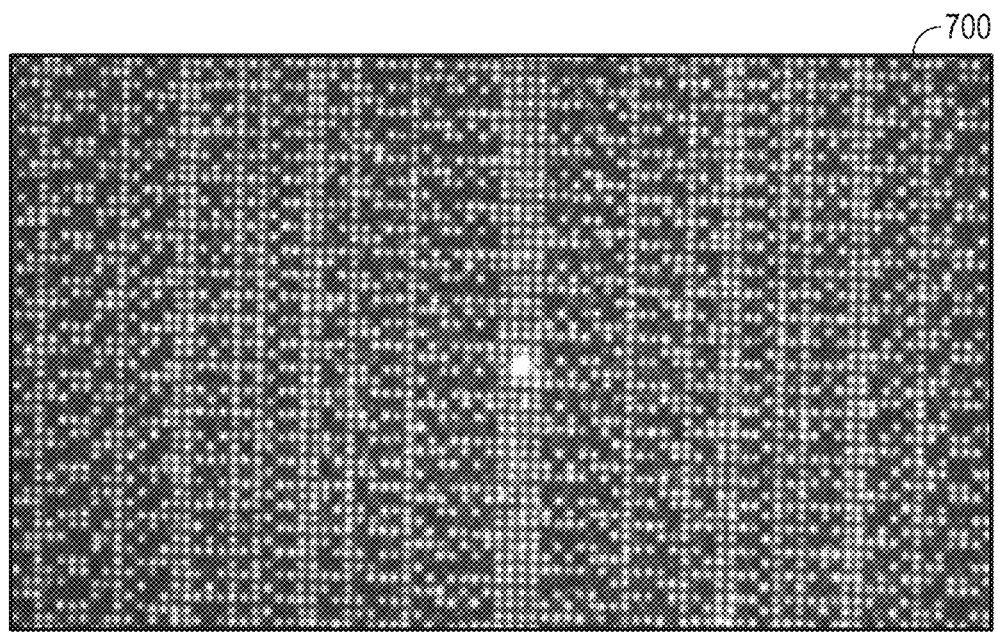
FIG. 7 is a picture illustrating an example of a code mask with arrays of symbols corresponding to bright and dark spots.

FIG. 7 is a picture of an example of a code mask 700 with arrays of symbols corresponding to bright and dark spots. In this example, the bright spots correspond to "1" symbols. In other embodiments, each bright spot may represent a zero ("0") symbol and the dark spots may represent a one ("1") symbol. The bright spots are aligned in rows and columns, and separated by black guard intervals and guard bands that give structure to the projected codes and make it possible to determine spatial boundaries of individual symbols and codewords. Codewords occupy a rectangular spatial area that includes rows and columns of symbols. For example, a codeword may include sixteen symbols in four rows and four columns. The "1" symbols with bright spots are visible, but the "0" symbols with dark spots blend into the guard intervals and guard bands.

Figure 8:
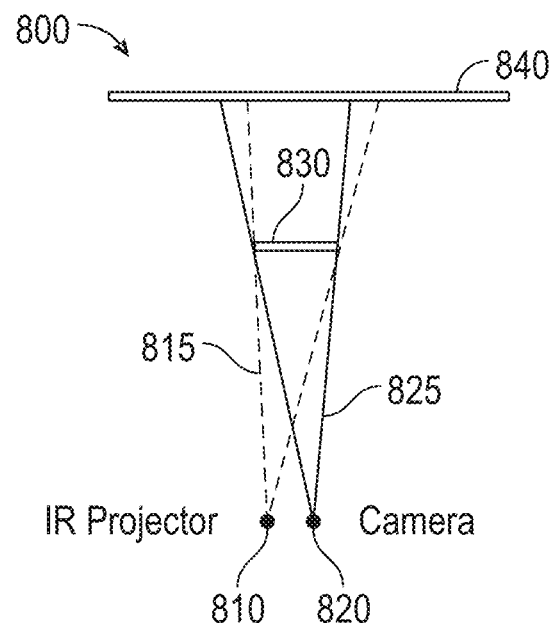
FIG. 8 is a diagram of a top view of an example scene with an infrared projector that projects codewords over a field of view onto a scene with a rectangular object and background.

FIG. 8 is a diagram of a top view of an example scene 800 with an infrared projector 810 that projects codewords over a field of view 815 onto a scene with a rectangular object 830 and background 840. A camera 820 with field of view 825 captures an image of object 830 and background 840 to generate a disparity map 900.

Figure 9:
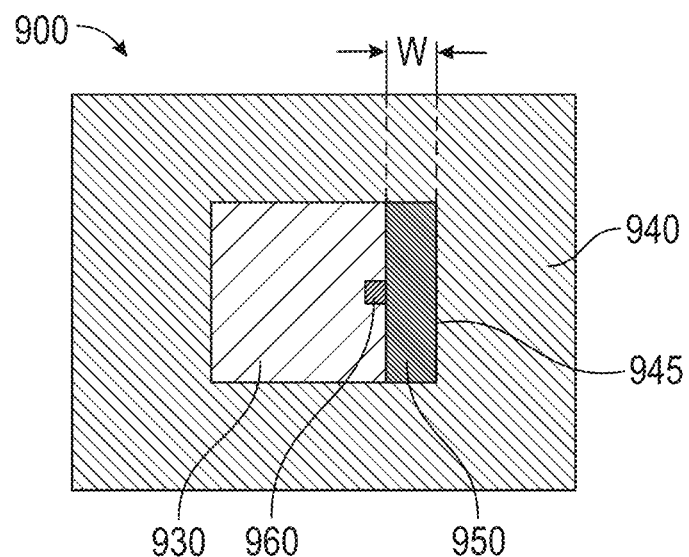
FIG. 9 is a disparity map of the rectangular object of FIG. 8, its shadow, and background.

FIG. 9 is an example of a disparity map 900 of the rectangular object 830 of FIG. 8, its shadow, and background. Disparity map 900 includes object image 930 of object 830, background image 940 of background 840, and first shadow region 950, and second shadow region 960. First shadow region 950 and second shadow region 960 form to the right of the object 830 in this example because the camera 820 is horizontally aligned with, and positioned to the right of, the infrared projector 810.

The rightmost boundary of first shadow region 950 has the same shape of the rightmost boundary of object 830. Second shadow region 960 may be formed by an irregularity or texture of the surface of object 830; it does not reflect the shape of the boundary of object 830. The rightmost boundary 945 of the first shadow region 950, which has the same shape as the rightmost boundary of object 830 (FIG. 8); can be displaced (shifted) to the left by the number of pixels corresponding to the width (W) of the first shadow region 950 to coincide with the rightmost edge of the object 830 to correct for irregularity or texture of the surface of object 830 that causes second shadow region 960.

The width (W) of the first shadow region 950 can be estimated by calculating a median, mode, or average number of adjacent shadow pixels (also referred to as "outage pixels"). Outliers may be excluded when determining width. Shadow pixels to the left of the displaced boundary correspond to the second shadow region 960 pixels that occur because of an irregularity or surface texture of the object 830. These outage pixels may be "corrected" or filled in as object pixels. The disparity values of the object pixels may be approximated by interpolating disparity values of neighboring object pixel disparity values.

Figure 10:
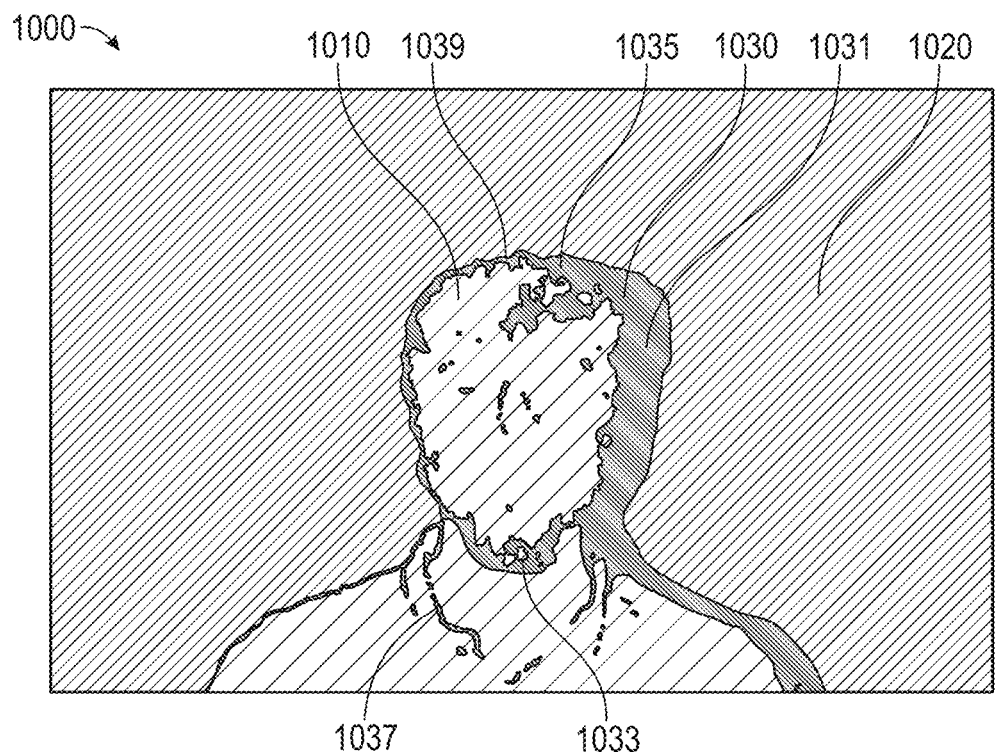
FIG. 10 is a disparity map of a man's head and shoulder, including outage pixels from shadow.

FIG. 10 is an example of a disparity map 1000 that represents a man's head and shoulders, including outage pixels from a projected light shadow. An "outage pixel" is defined as a pixel for which a valid spatial code has not been received. The pixels 1010 (represented with a first pattern) include the man's head and shoulders, with the brightest pixels at the tip of the man's nose because it is closest to the camera. The pixels 1020 (represented by a second pattern) are illustrated as being darker because they are farther from the camera than the man in the foreground. The pixels 1030 (represented by a third pattern) correspond to outage pixels without codes, for which depth has not been estimated. The code outages at the pixels 1030 may correspond to the shadow region 1031 to the right of the man's head in the image, under his chin 1033, towards the top of his head 1035, along his collar line 1037, and elsewhere along the perimeter 1039 of the man's head and shoulders. The pixels 1030 towards the top of the man's head 1035 and at/near his chin 1033 may be due to the texture of his hair and beard. Shadow region 1030 includes outage pixels from the shadow formed by the man's head and shoulders (corresponding to first shadow region 950 of FIG. 9), as well as outage pixels that occur because of an irregularity or surface texture (such as hair) of the man (corresponding to second shadow region 960 of FIG. 9).

Depth (and disparity) can be calculated for both the pixels 1010 in the foreground and the pixels 1020 in the background by the structured light techniques described above with respect to FIG. 3. However, depth can't be directly calculated at pixel positions with code outages; instead, depths can only be estimated at these locations. For example, if there is a single outage pixel (a single pixel lacking a depth estimate because a valid code was not received) and all neighboring pixels in the disparity map are within a tolerance of the same depth, the depth at the pixel with the outage can be estimated accurately based on the neighboring depths.

If the neighboring pixels have different depths, because the outage pixel is at or near an object boundary, then a depth estimate for the outage pixel based on the neighboring pixels may be inaccurate because foreground and background pixels at substantially different depths will be combined or averaged. This would tend to blur or low pass filter boundaries, resulting in less distinct object boundaries with less accurate depth estimates close to the boundary.

More accurate estimates would be possible in shadow regions if the object boundary is reconstructed so that depth estimates are based on only those pixels on the same side of the object boundary line are considered Therefore, the outage pixels can be filled in more accurately by first reconstructing the boundary of his head, and then estimating depths at each pixel on the object side of the boundary using known depths for neighboring object pixels, and estimating depths at each pixel on the background side of the boundary using known depths for neighboring background pixels.

Figure 11:
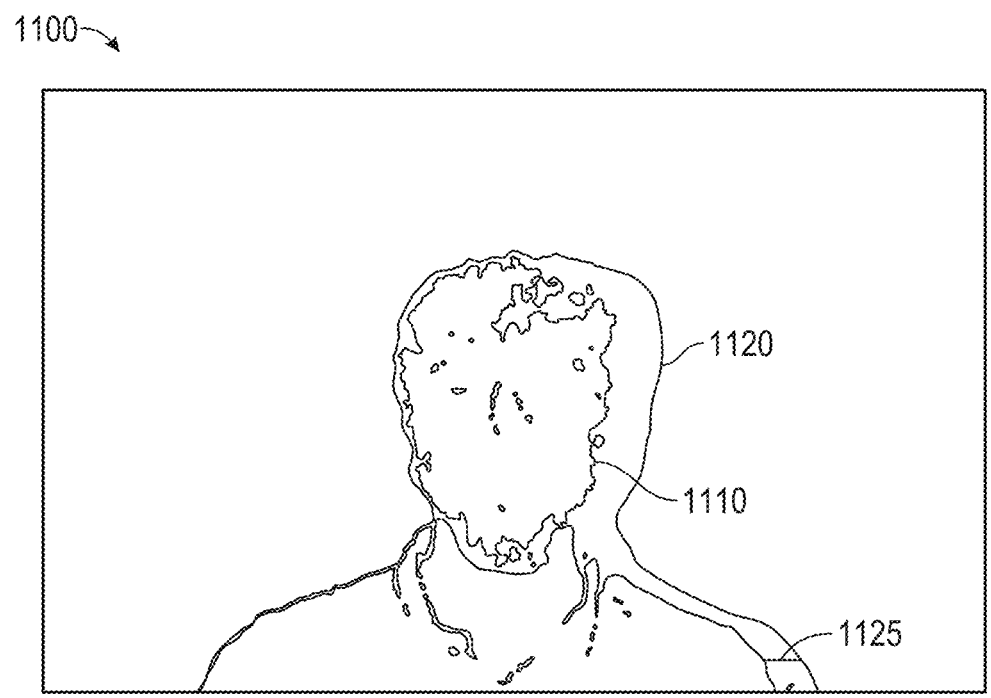
FIG. 11 is an image with boundaries (edges) of the disparity map of the man of FIG. 10, including object/outage and outage/background boundaries.

FIG. 11 is an image with boundaries (edges) of the disparity map 1000 of the man of FIG. 10, including object/outage and outage/background boundaries. In the example of FIG. 11, boundary image 1100 includes object/outage boundary 1110 between object pixels and outage pixels and outage/background boundary 1120 between outage pixels and background pixels. Object pixels, outage pixels, and background pixels correspond to pixels 1010, pixels 1030, and pixels 1020, respectively, illustrated in FIG. 10. The outage/background boundary 1110 follows the contour of the man's head and left shoulder because shadow outlines correspond in shape to the object that formed the shadow.

In the example of FIG. 11, the outage/background boundary 1120 to the right of the man's head more closely corresponds to the shape of his head than the object/outage boundary of his head. The outage/background boundary for the man's head may be used to reconstruct the shape of the man's head by displacing the outage/background boundary by the width 1125 of the shadow region so that the two boundaries overlap.

Figure 12:
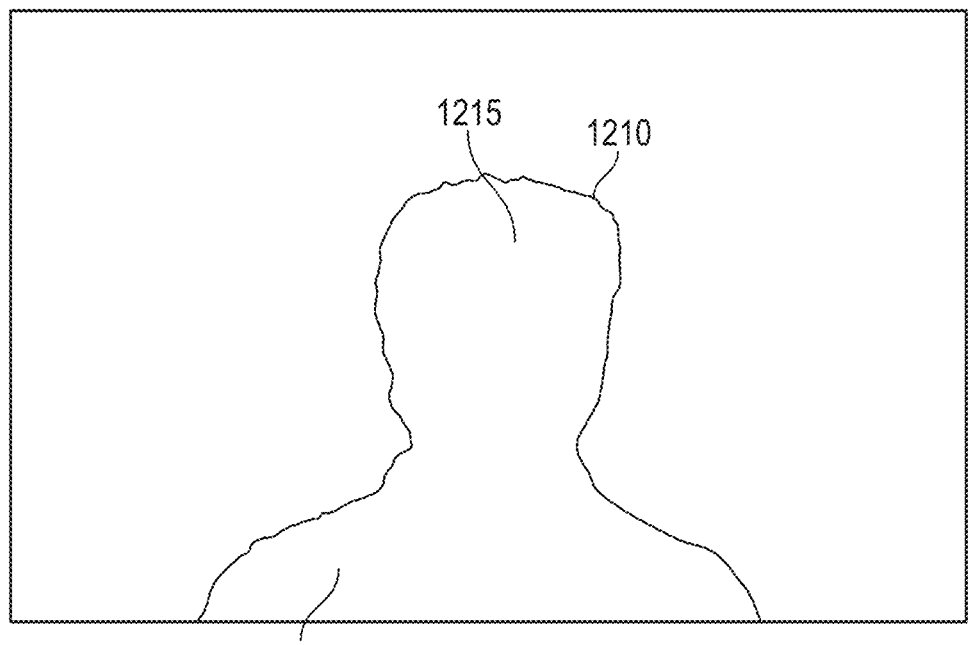
FIG. 12 is an image with the reconstructed object boundary of the man of FIG. 10 after displacing the outage/background boundary by a width of the shadow region.

FIG. 12 illustrates the reconstructed object boundary 1210 of the man's head 1215 and shoulders 1220 after displacing the outage/background boundary 1120 by a width 1125 of the shadow region. Once displaced, the outage/background boundary 1120 forms a more accurate representation of the object boundary.

Figure 13:
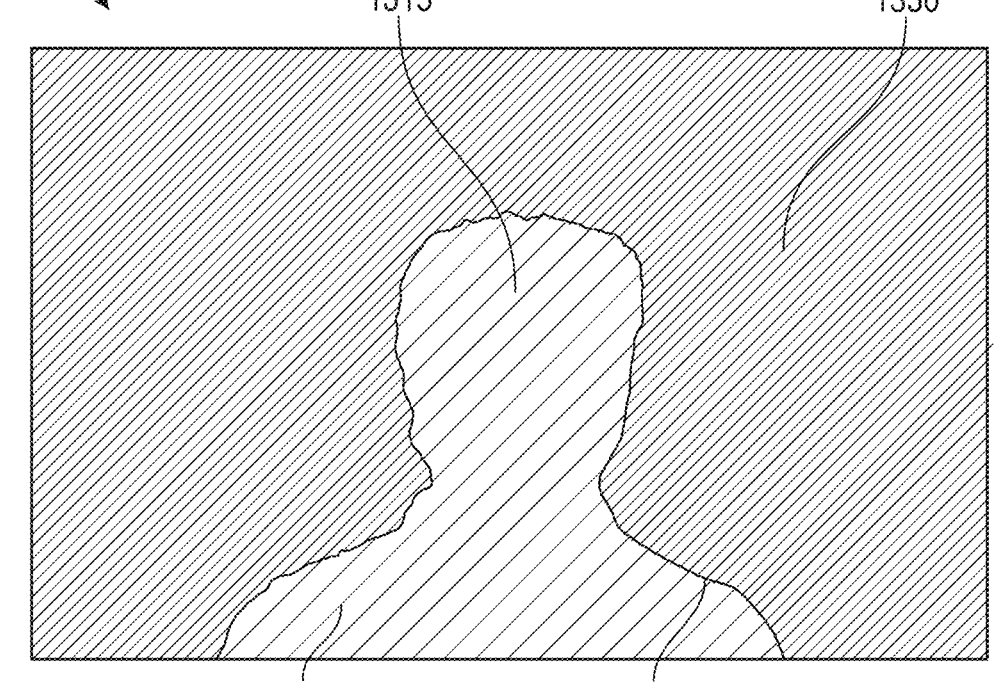
FIG. 13 is a disparity map with estimates for outage pixels based on the reconstructed object boundary of FIG. 12.

FIG. 13 is a disparity map 1300 with estimates for outage pixels based on the reconstructed object boundary 1210 of FIG. 12. Depths for each outage pixel within the new object boundary 1310 of the man's head 1315 and shoulders 1320 are estimated using neighboring object pixel depths (and not background pixel depths). Depths of outage pixels on the other side of the reconstructed boundary 1210 are estimated using neighboring background pixel depths (and not object pixel depths). This results in a more accurate disparity map 1300 than is possible without object boundary reconstruction.

Figure 14:
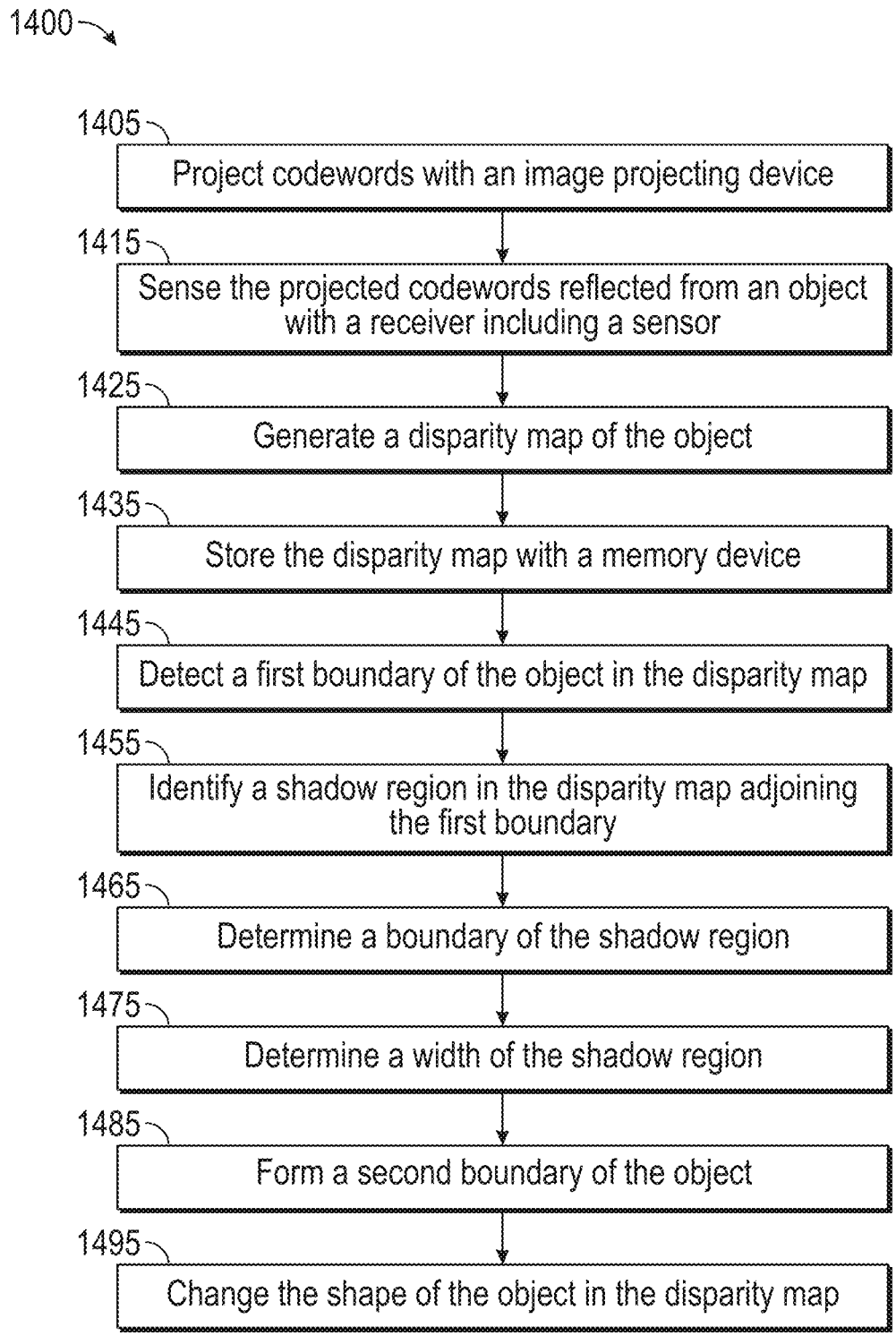
FIG. 14 illustrates an example of a process 1400 for reconstructing an object boundary in a disparity map.

FIG. 14 illustrates an example of a process 1400 for reconstructing an object boundary in a disparity map.

At block 1405, process 1400 projects codewords with an image processing device. Process 1400 projects laser light through a codemask to project codewords onto a scene. The codemask has the same codewords, associated symbols, and are formed by the same harmonic basis functions as the codemask described above with respect to FIGS. 3 and 4. The codewords are continuously projected for a time interval. The projected codewords may be projected onto a scene, or objects in a scene. This may be performed, for example, by the image projecting device 408 of FIG. 4 or the light emitter 602 of FIG. 6.

At block 1415, process 1400 senses the projected codewords reflected from an object with a receiver including a sensor. The received codewords may be received in an image of the scene or objects in the scene. This may be performed by a receiver sensor 508 of FIG. 5, or a sensor integrated with a light source for example, light receiving element 604 integrated with a light emitter 602 of FIG. 6.

At block 1425, process 1400 generates a disparity map. Process 1400 may use structured light methods as described with regard to FIG. 3, in which codeword displacements are used to generate depth information. Process 1400 may generate disparity map information from a single structured light frame, or multiple structured light frames. This may be performed, for example, by processing circuit 504 of FIG. 5 or processor 606 of FIG. 6.

At block 1435, process 1400 stores the disparity map with a memory device. This may be performed, for example by the memory storage device 506 of FIG. 5, memory 608 of FIG. 6, or memory/storage device 406 of FIG. 4.

At block 1445, process 1400 detects a first boundary of the object in the disparity map. Process 1400 may determine the first boundary of the object by locating object pixels with a neighboring shadow (outage) pixel. The first boundary of the object may exclude outage pixels and shaded regions from within the bounded object, such as a single outage pixel (or small groups of pixels) surrounded by object pixels.

This may be performed, for example by the processing circuit 504 of FIG. 5 or processor 606 of FIG. 6.

At block 1455, process 1400 identifies a shadow region in the disparity map adjoining the first boundary. Process 1400 may include outage pixels without codewords or calculated depths in the shadow region. Process 1400 may, for each row of the disparity map, include adjacent outage pixels between the first boundary and a background pixel in the shadow region. Process 1400 may exclude object pixels and background pixels from the shadow region. This may be performed, for example by the processing circuit 504 of FIG. 5 or processor 606 of FIG. 6.

At block 1465, process 1400 determines a boundary of the shadow region. Each row with pixels in the shadow region includes adjacent outage pixel between the first boundary of the object and a boundary of the shadow region adjoining a background pixel. In various embodiments, process 1400 determines the boundary of the shadow region by starting at the first boundary of an object (an object pixel on the boundary with the shadow region) and traversing the adjacent pixels in the shadow region until reaching the outage pixel that adjoins a background pixel, to determine the pixel in the shadow region boundary for each row, to determine the boundary of the shadow region. The shadow boundary may be determined to be where there is a transition between the invalid (outage) pixel and a background pixel. The width of the shadow in a single row is the number of adjacent outage pixels. For example, as discussed above with respect to FIG. 9, the shadow pixels may include pixels from both first shadow region 950 and second shadow region 960. The rightmost boundary of first shadow region 950 has the same shape of the rightmost boundary of rectangular object 830. Second shadow region 960 is formed by an irregularity or texture of the surface of rectangular object 830; it does not reflect the shape of the boundary of rectangular object 830. The rightmost boundary of the first shadow region 950, which has the same shape as the rightmost boundary of rectangular object 830; can be displaced (shifted) to the left by the number of pixels corresponding to the width of the first shadow region 950 to coincide with the rightmost boundary of the rectangular object 830 to correct for irregularity or texture of the surface of rectangular object 830 that causes second shadow region 960. This may be performed, for example by the processing circuit 504 of FIG. 5 or processor 606 of FIG. 6.

At block 1475, process 1400 determines a width of the shadow region. The width of the shadow region may be determined based on the number of adjacent outage pixels, which corresponds to the number of pixels between the first boundary and the boundary of the shadow region in each row. The widths of a plurality of rows may be combined using statistical techniques, such as determining a median, mode or mean width across multiple rows. Process 1400 may exclude rows with large numbers of adjacent outage pixels within an object boundary after correction. In various embodiments, the width is adjusted to more closely align portions of the shadow region boundary to the first boundary for these rows. If an object is leaning forward, the width in its top rows is larger than in its bottom rows. This means that the shadow outline is displaced more on the top than on the bottom. In some embodiments, a shadow that occupies less than a threshold number of rows may be excluded from consideration. For example, if there are outages in one row, but not in adjoining rows, there may not be sufficient information to correct an object boundary. This may be performed, for example by the processing circuit 504 of FIG. 5 or processor 606 of FIG. 6.

At block 1485, process 1400 forms a second boundary of the object. This may be done, for example, by displacing a representation of the shadow boundary towards the object by the width of the shadow region, the displaced representation forming a second boundary of the object. As discussed above with respect to FIG. 9, the rightmost boundary of the rectangular object 830 can be changed by displacing the rightmost boundary of the first shadow region 950 to the left by the width of the first shadow region 950. For example, if the determined width is 10 pixels, and the column location of the shadow boundary in row 116 is at column 224, corresponding to coordinate (116, 224), then the displaced shadow boundary in row 116 is at column 214, corresponding to coordinate (116, 214). Once the rightmost boundary of the first shadow region 950 (shadow boundary) is displaced to the left by the determined width of the first shadow region 950, this displaced boundary may largely coincide with the rightmost boundary of the rectangular object 830. Shadow pixels to the left of the displaced boundary, for example, at coordinate (116, 213), may correspond to the second shadow region 960 pixels that occur because of an irregularity or surface texture of the rectangular object 830. In various embodiments, the displacement takes place in increments and the degree of alignment between the shadow boundary and the first boundary are maximized. This may be performed, for example by the processing circuit 504 of FIG. 5 or processor 606 of FIG. 6.

At block 1495, process 1400 changes the shape of the object in the disparity map based on the second boundary. Process 1400 may change a shape of the object by adjusting its first boundary as detected in block 1445. In various embodiments, the first boundary is replaced by the boundary of the shadow region, and outage pixels between the two boundaries are assumed to be object pixels, while outage pixels not between the two pixels are assumed to be background pixels. Depths of the outage pixels between the two boundaries that are assumed to be object pixels may be estimated based on the depths of neighboring object pixels only (and not background pixel depths). Depths of the outage pixels not between the two pixels are assumed to be background pixels may be estimated based on the depths of neighboring background pixels only (and not object pixel depths). In various embodiments, process 1400 smooths portions of the first boundary that do not adjoin the shadow region using disparity map values of adjoining object pixels In various embodiments, process 1400 updates the disparity map based on the changed shape of the object, and stores the updated disparity map with a memory device. This may be performed, for example by the processing circuit 504 of FIG. 5 or processor 606 of FIG. 6, and by the memory storage device 506 of FIG. 5, memory 608 of FIG. 6, or memory/storage device 406 of FIG. 4.

It should be understood that any reference to an element herein using a designation, for example, "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table for example a look-up table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, for example, various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium, for example, a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A structured light system, comprising:
   an image projecting device configured to project codewords;
   a receiver device including a sensor, the receiver device configured to sense the projected codewords reflected from an object;
   a processor configured to:
      generate a disparity map of the object,
      detect a first boundary of the object in the disparity map,
      identify a shadow region in the disparity map adjoining the first boundary, the shadow region including pixels with codeword outages,
      change a shape of the object in the disparity map based on a representation of a boundary of the shadow region displaced towards the object by at least a portion of a width of the shadow region, wherein the displacement of the representation of the shadow boundary increases overlap between the first boundary and the boundary of the shadow region; and
   a memory device configured to store the disparity map.

2. The structured light system of claim 1, wherein the processor is further configured to determine the boundary of the shadow region and determine the width of the shadow region.

3. The structured light system of claim 2, wherein the processor is further configured to determine the width of the shadow region based on a number of adjacent pixels in the shadow region from a plurality of rows of the disparity map.

4. The structured light system of claim 3, wherein the processor determines the width by calculating a median number of adjacent pixels in the shadow region adjoining the first boundary.

5. The structured light system of claim 3, wherein the processor determines the width by calculating an average number of adjacent pixels in the shadow region adjoining the first boundary.

6. The structured light system of claim 1, wherein the processor is further configured to smooth portions of the first boundary that do not adjoin the shadow region using disparity map values of adjoining object pixels.

7. The structured light system of claim 1, wherein the processor is further configured to update the disparity map based on the changed shape of the object in the disparity map.

8. The structured light system of claim 7, wherein the memory device is further configured to store the updated disparity map.

9. A method of reconstructing an object boundary in a disparity map, comprising:
projecting codewords with an image projecting device;
sensing the projected codewords reflected from an object with a receiver device including a sensor;
generating a disparity map of the object;
storing the disparity map with a memory device;
detecting a first boundary of the object in the disparity map;
identifying a shadow region in the disparity map adjoining the first boundary, the shadow region including pixels with codeword outages;
changing a shape of the object in the disparity map based on a representation of a boundary of the shadow region displaced towards the object by at least a portion of a width of the shadow region, wherein the displacement of the representation of the shadow boundary increases overlap between the first boundary and the boundary of the shadow region.

10. The method of claim 9, further comprising determining the boundary of the shadow region and determining the width of the shadow region.

11. The method of claim 10, further comprising determining the width of the shadow region based on a number of adjacent pixels in the shadow region from a plurality of rows of the disparity map.

12. The method of claim 11, further comprising determining the width by calculating a median number of adjacent pixels in the shadow region adjoining the first boundary.

13. The method of claim 11, further comprising determining the width by calculating an average number of adjacent pixels in the shadow region adjoining the first boundary.

14. The method of claim 9, further comprising smoothing portions of the first boundary that do not adjoin the shadow region using disparity map values of adjoining object pixels.

15. The method of claim 9, further comprising updating the disparity map based on the changed shape of the object in the disparity map.

16. The method of claim 15, further comprising storing the updated disparity map in the memory device.

17. A structured light system, comprising:
means for projecting codewords;
means for sensing the projected codewords reflected from an object;
means for generating a disparity map of the object;
means for storing the disparity map;
means for detecting a first boundary of the object in the disparity map;
means for identifying a shadow region in the disparity map adjoining the first boundary, the shadow region including pixels with codeword outages;
means for changing a shape of the object in the disparity map based on a representation of a boundary of the shadow region displaced towards the object by at least a portion of a width of the shadow region, wherein the displacement of the representation of the shadow boundary increases overlap between the first boundary and the boundary of the shadow region.

18. The structured light system of claim 17, wherein the projecting means comprises a laser system, wherein the sensing means comprises a receiver sensor, wherein the generating means comprises a processor, wherein the storing means comprises a memory device, wherein the first boundary detecting means comprises the processor, wherein the shadow region identifying means comprises the processor, wherein the shadow region boundary determining means comprises the processor, and wherein the changing means comprises the processor.

19. The structured light system of claim 17, further comprising means for determining the boundary of the shadow region and determining the width of the shadow region.

20. The structured light system of claim 19, further comprising means for determining the width of the shadow region based on a number of adjacent pixels in the shadow region from a plurality of rows of the disparity map.

21. The structured light system of claim 20, further comprising means for determining the width by calculating a median number of adjacent pixels in the shadow region adjoining the first boundary.

22. The structured light system of claim 20, further comprising means for determining the width by calculating an average number of adjacent pixels in the shadow region adjoining the first boundary.

23. The structured light system of claim 17, further comprising means for smoothing portions of the first boundary that do not adjoin the shadow region using disparity map values of adjoining object pixels.

24. The structured light system of claim 17, further comprising means for updating the disparity map based on the changed shape of the object in the disparity map.

25. The structured light system of claim 24, further comprising means for storing the updated disparity map.

26. A non-transitory computer-readable medium storing instructions that when executed cause a processor to perform a method of reconstructing an object boundary in a disparity map, the method comprising:
projecting codewords with an image projecting device;
sensing the projected codewords reflected from an object with a receiver device including a sensor;
generating a disparity map of the object;
storing the disparity map with a memory device;
detecting a first boundary of the object in the disparity map;
identifying a shadow region in the disparity map adjoining the first boundary, the shadow region including pixels with codeword outages;
changing a shape of the object in the disparity map based on a representation of a boundary of the shadow region displaced towards the object by at least a portion of a width of the shadow region, wherein the displacement of the representation of the shadow boundary increases overlap between the first boundary and the boundary of the shadow region.

27. The method of claim 26, further comprising:
determining the width of the shadow region based on a number of adjacent pixels in the shadow region from a plurality of rows of the disparity map;
forming a second boundary of the object using the displaced representation of the boundary of the shadow region;
and
smoothing portions of the first boundary that do not adjoin the shadow region using disparity map values of adjoining object pixels.

* * * * *